United States Patent [19]

Dame

[11] Patent Number: 4,475,536
[45] Date of Patent: Oct. 9, 1984

[54] SOLAR COLLECTOR-SKYLIGHT ASSEMBLY

[75] Inventor: Richard E. Dame, Silver Spring, Md.

[73] Assignee: Mega Engineering, Silver Spring, Md.

[21] Appl. No.: 465,155

[22] Filed: Feb. 9, 1983

[51] Int. Cl.³ .............................................. F24J 3/02
[52] U.S. Cl. ................... 126/419; 126/438; 126/443; 126/446; 126/450; 350/263
[58] Field of Search ............... 126/419, 422, 438, 443, 126/446, 450, 439, 424; 52/80; 350/258, 259, 263, 299; 160/5, 166 R, 167, 174, 107

[56] References Cited

U.S. PATENT DOCUMENTS

| | | | |
|---|---|---|---|
| 2,969,788 | 1/1961 | Newton | 126/439 |
| 3,012,294 | 12/1961 | Waldor | 126/429 X |
| 4,026,269 | 5/1977 | Stelzer | 126/438 X |
| 4,079,725 | 3/1978 | Chadick | 126/438 X |
| 4,143,640 | 3/1979 | Pierce | 126/438 X |
| 4,144,931 | 3/1979 | Medico | 126/446 X |
| 4,162,824 | 7/1979 | Ma | 126/439 X |
| 4,217,881 | 8/1980 | Brent | 126/439 X |
| 4,223,664 | 9/1980 | Fattor | 126/438 |
| 4,270,524 | 6/1981 | Bächli | 126/438 X |
| 4,284,069 | 8/1981 | Hörster et al. | 126/438 |
| 4,304,218 | 12/1981 | Karlsson | 126/419 |
| 4,387,704 | 6/1983 | Minden | 126/438 X |

FOREIGN PATENT DOCUMENTS 2442412 7/1980 France ............................... 126/438

*Primary Examiner*—Samuel Scott
*Assistant Examiner*—Margaret A. Focarino
*Attorney, Agent, or Firm*—Brady, O'Boyle & Gates

[57] ABSTRACT

A solar collector-skylight assembly having movable parabolic concentrators wherein, in one position the parabolic concentrators direct solar energy to a collector to heat fluid circulating therethrough to thereby provide a solar heater; and when the concentrators are moved to another position, the assembly functions as a skylight wherein the solar energy is allowed to pass through the collector, to thereby illuminate the interior of a building upon which the solar collector-skylight assembly is mounted.

8 Claims, 8 Drawing Figures

SOLAR COLLECTOR-SKYLIGHT ASSEMBLY

BACKGROUND OF THE INVENTION

Various solar collector - skylight assemblies have been proposed wherein the assembly is constructed and arranged to function not only as a solar heater, but also as a skylight to illuminate the interior of a building upon which the assembly is mounted. Examples of such assemblies are disclosed in U.S. Pat. Nos. 4,144,931 dated Mar. 20, 1979; and 4,219,008 dated Aug. 26, 1980. These assemblies include shutters or vanes adapted for movement between a heat absorption position, wherein the assembly functions as a solar heater, to a second position allowing the sun rays to pass through the solar collector, whereby the assembly functions as a skylight.

The solar collector - skylight assembly of the present invention is an improvement over the prior art solar collector - skylight assemblies, in that, in lieu of vanes or shutters, parabolic reflectors are employed for not only focusing the sun rays on the collector during the solar heater phase, but also for focusing the sun rays through the collector during the skylight phase of operation. By this construction and arrangement, the fluid flowing through the solar collector is more efficiently heated, and more sunlight is directed into the interior of the building than provided heretofore.

The solar collector - skylight assembly of the present invention comprises essentially, a housing adapted to be mounted on the roof or wall of a building, the housing having a transparent top wall and a translucent bottom wall. A plurality of fluid circulating pipes, having heat absorbing plates secured thereto, are mounted within the housing, and a plurality of parabolic reflectors are slidably mounted within the housing in proximity to the fluid circulating pipes whereby the reflectors are shiftable from a heat absorbing position wherein the sun rays are focused on the pipe heat absorbing plates, to a skylight position wherein the sun's rays are focused into the interior of the building. A temperature responsive control mechanism is operatively connected to the reflectors for shifting the reflectors between full heat absorbing and skylight positions, and also to intermediate positions wherein simultaneous adjustment of the solar energy absorbed by the solar collector and amount of illumination in the building can be obtained.

DESCRIPTION OF THE PREFERRED EMBODIMENT

Figure 1:
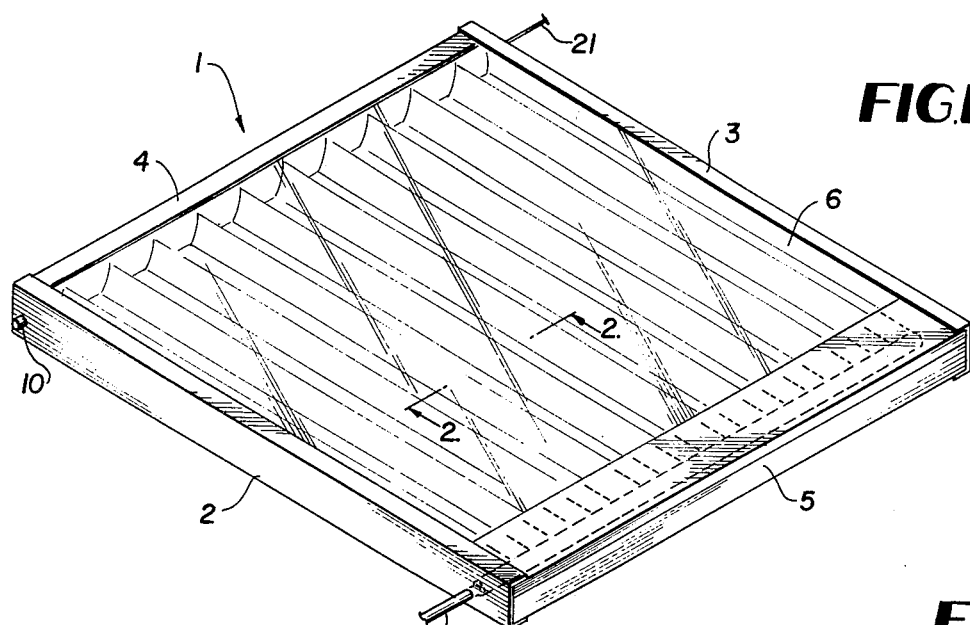
FIG. 1 is a perspective view of the solar collector-skylight assembly of the present invention.
Figure 2:
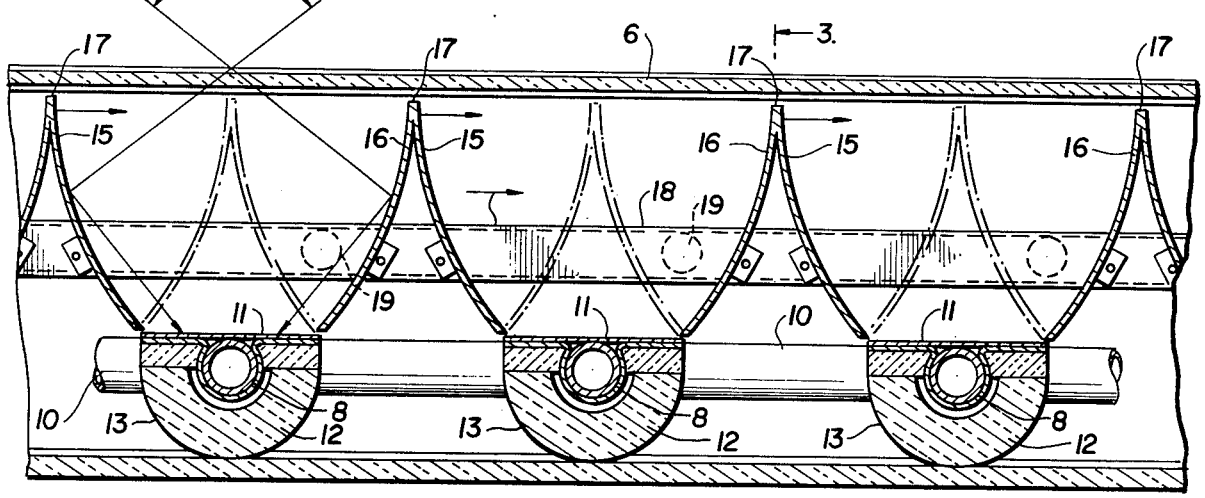
FIG. 2 is a view taken along line 2—2 of FIG. 1.
Figure 3:
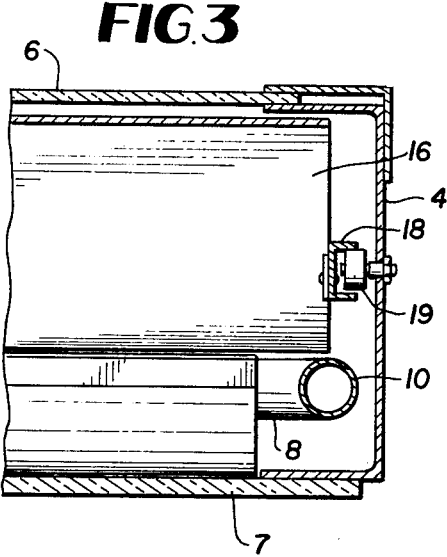
FIG. 3 is a view taken along line 3—3 of FIG. 2.

Referring to the drawings and more particularly to FIGS. 1, 2 and 3 thereof, the solar collector-skylight assembly 1 of the present invention comprises a rectangular housing formed by a pair of side channel members 2 and 3, and end channel members 4 and 5. The top of the housing is provided with a clear, transparent low-iron glass cover 6 secured to the top of the channel members, and the bottom of the housing is covered with a translucent light-diffusing or non-diffusing glazing material 7, such as Rohm Haas-Twinwall material or glass. A plurality of transversely extending fluid circulating pipes 8 are mounted within the housing, the pipes being connected at one end to an air or water inlet manifold 9 and at the other end to an outlet manifold 10.

Each pipe 8 has a dark coated heat absorbing plate 11 secured to the upper surface thereof in heat conducting relationship to the fluid flowing through the pipes 8, the remainder of each pipe having a suitable heat insulating material 12 such as fiberglass secured thereto. The outer surface of the insulation material is provided with a specular reflective or diffuse reflective material 13.

Figure 4:
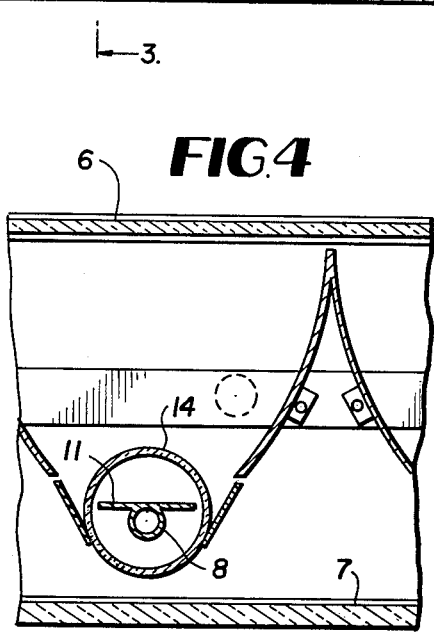
FIG. 4 is a fragmentary, sectional, side elevational view of another embodiment of a collector tube employed in the solar collector-skylight assembly of the present invention.

While the heat absorbers shown in FIG. 2 employ flat absorber plates 11 insulated on their back surfaces to prevent heat loss, the absorber shown in FIG. 4 can be employed wherein the pipe 8 and associated absorber plate 11 are positioned within an evacuated transparent tube 14.

In order to direct sun rays into the absorber plates 11 when the assembly of the present invention is being utilized as a solar heater, a parabolic reflector is provided for each plate. As will be seen in FIGS. 2 and 3, each reflector comprises a pair of parabolic segments 15 and 16, each segment 15 being integrally connected as at 17 to the next adjacent segment 16. The segments 15 and 16 are secured to a pair of longitudinally extending channels 18 forming a track engaged by rollers 19 secured to the housing channel members 4 and 5. By this construction and arrangement, when the segments 15 and 16 are in the solid line position, as shown in FIG. 2, the sun rays are focused on the absorber plate 11, to thereby heat the fluid flowing through the pipe 8. When the segments 15 and 16 are moved in the direction of the arrows shown in FIG. 2, to the dotted line position, the sun's rays are obstructed from the absorber plates 11 and focused through the bottom wall 7 of the housing into the interior of the building upon which the device is mounted, to thereby function as a skylight.

The parabolic reflectors are designed to have an acceptance angle $\alpha$ shown in FIG. 2, selected sufficient to accommodate the solar altitude or zenith angle for the desired range of hours of operation in the particular locality in which the solar collector - skylight assembly is to be located.

Figure 5:
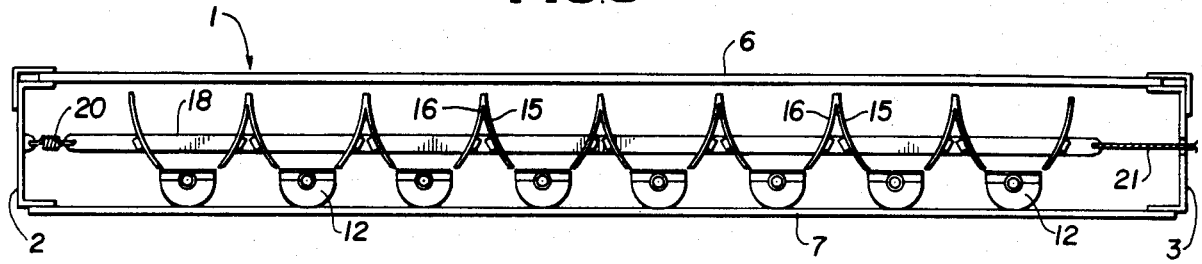
FIG. 5 is a side elevational view of the solar collector-skylight assembly of the present invention.
Figure 6:
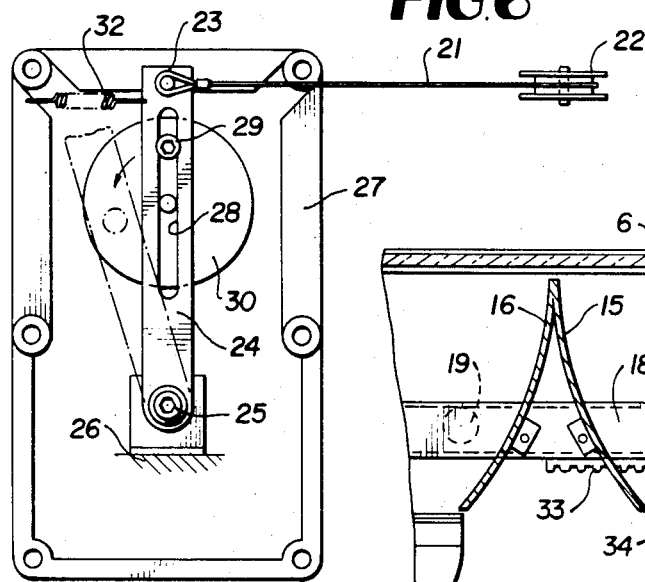
FIG. 6 is a side elevational view of the motor assembly employed for moving the concentrators from the solar heater position to the skylight position.
Figure 8:
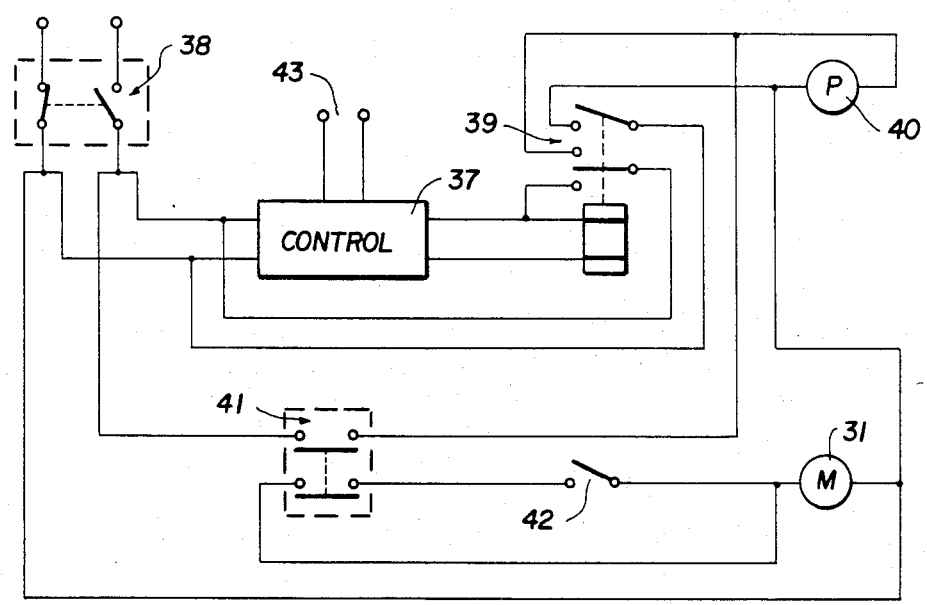
FIG. 8 is a schematic of the electrical circuit employed in the solar collector-skylight assembly of the present invention.

The mechanism for shifting or sliding the parabolic reflectors within the housing 1 is shown in FIGS. 5 and 6, wherein it will be seen that a tension spring 20 is connected between the end of each channel member 18 and the adjacent side channel 2 of the housing. A pull cable 21 is connected to the opposite end of one of the channels 18 and extends around a pulley 22 and secured as at 23 to the free end of a rocker arm 24, the opposite end of the arm 24 being pivotally mounted as at 25 to a fixed support 26 within a housing 27. The rocker arm 24 is provided with a longitudinally extending slot 28 through which the free end of a pin 29 extends, the opposite end of the pin being connected to a rotary disc 30 connected to the drive shaft of a motor 31 (FIG. 8). By this construction and arrangement, when the motor 31 is energized, the disc 30 is caused to rotate in a counterclockwise direction to move the rocker arm 24 to the dotted line position shown in FIG. 6. As the rocker arm 24 moves, the cable 21 pulls the channel 18, thereby shifting the position of the parabolic reflectors to the position shown and described hereinabove in connection with FIG. 2, while extending the spring 20. Continued rotation of the disc 30 will cause the rocker arm 24 to pivot in the opposite direction, thereby slackening the cable 21, whereby the parabolic reflectors are shifted back to their original position by the restoring force of the tension spring 20. In order to limit the movement of the rocker arm 24 during the slackening of the cable 21, a tension spring 32 is connected between the arm 24 and housing 27. While not shown, it will be understood that the pulley 22 and housing 27 are mounted on the side of the solar collector skylight housing 1.

Figure 7:
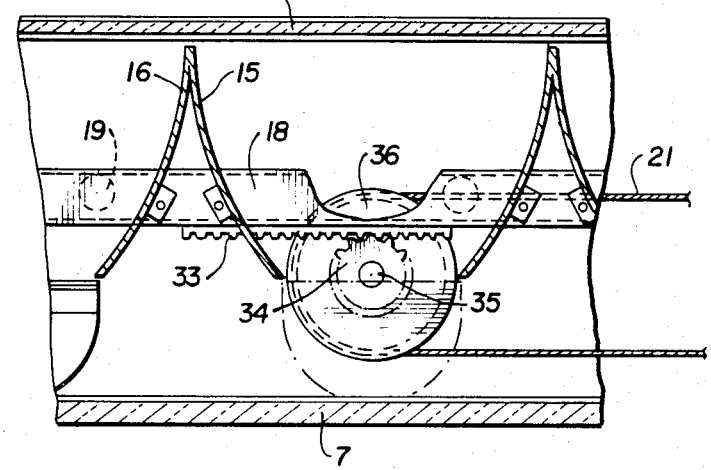
FIG. 7 is a fragmentary, side elevational view of another embodiment of a drive arrangement for moving the concentrators.

Another embodiment for moving the channel 18 and associated parabolic reflectors is shown in FIG. 7, wherein a rack 33 is secured to the bottom of channel 18 and meshes with a pinion 34 secured to a shaft 35 journalled in the housing end wall 4. A pulley 36 is also secured to the shaft 35, and the cable 21, having one end secured to the side wall of the housing, extends around the pulley and is connected to the rocker arm mechanism shown in FIG. 6.

The circuit for controlling the operation of the solar collector - skylight assembly 1 is shown schematically in FIG. 8 wherein a control mechanism 37 is electrically connected between a main switch 38 and a relay 39 to a pump 40 for circulating fluid to be heated through the pipes 8, the motor 31, a dipole, double throw switch 41, and a manual limit switch 42. The control mechanism 37 is also connected to suitable sensors 43 which sense not only the temperature of the fluid flowing through the collector and the temperature in the interior of the building upon which the solar collector - skylight assembly is mounted, but also the light intensity within the building, whereby the information obtained by the control mechanism 37 is employed to control the pump 40 and motor 31, to thereby move the parabolic reflectors to full heat absorption position, to full light transmission position, or to a desired intermediate position.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A solar collector-skylight assembly adapted to be mounted on the exterior of a building, said assembly comprising a housing having end and side walls, a transparent top wall and a translucent bottom wall, a plurality of transversely extending fluid circulating pipes mounted within said housing, each pipe having a dark coated heat absorbing plate secured to the upper surface thereof, a plurality of parabolic reflectors mounted in said housing, each reflector comprising a pair of parabolic segments, each segment being integrally connected to the segment of the next adjacent reflector, each reflector being positioned adjacent a respective heat absorbing plate, for focusing the sun's rays on said plate, means interconnecting said parabolic reflectors, means connecting said interconnecting means to the end walls of said housing, and drive means connected to said interconnecting means for imparting rectilinear movement to said parabolic segments, whereby said parabolic reflectors are movable as a unit from a position wherein the sun's rays are focused on the heat absorbing plates to another position wherein the sun's rays are focused into the interior of a building upon which the assembly is mounted.

2. A solar collector-skylight assembly according to claim 1, wherein a heat insulating material extends around the outer surface of each pipe below the heat absorbing plate, and a reflective material on the outer surface of said heat insulating material.

3. A solar collector-skylight assembly according to claim 1, wherein each pipe and associated heat absorbing plate is mounted within an evacuated transparent tube.

4. A solar collector-skylight assembly according to claim 1, wherein the means interconnecting the parabolic reflectors comprises, a pair of longitudinally extending channels connected to said segments.

5. A solar collector-skylight assembly according to claim 4, wherein the means for connecting the interconnecting means to the end walls of the housing comprises a plurality of rollers journalled in the end walls of said housing and engaging said channels.

6. A solar collector-skylight assembly according to claim 4, wherein the drive means comprises a pull cable, one end of said cable being connected to one end of a channel, the opposite end of said cable being connected to a rocker arm, the output shaft of an electric motor being operatively connected to said rocker arm, and a tension spring connected between the opposite end of said channel and the adjacent side wall of said housing, whereby when the motor is energized the rocker arm is pivoted in a direction to pull the cable and associated channel to thereby shift the parabolic reflectors from a first position wherein the sun's rays are focused on the heat absorbing plates to another position wherein the sun's rays are focused into the interior of a building upon which the assembly is mounted, upon de-energization of said motor, said tension spring returns the channels and associated reflectors back to said first position.

7. A solar collector-skylight assembly according to claim 4, wherein the drive means comprises a rack secured to the bottom of a channel, said rack meshing with a pinion gear secured to a shaft journalled in the housing end wall, a pulley secured to said shaft, a cable extending around said pulley, one end of said cable being secured to a side wall of said housing, the opposite end of said cable being connected to a rocker arm, the output shaft of an electric motor being operatively connected to said rocker arm, and a tension spring connected between an end of said channel and the adjacent side wall of said housing, whereby upon energization of said motor, the rocker arm is pivoted in a direction to pull the cable causing rotation of said pinion resulting in a rectilinear movement of said rack and associated channel, upon deenergization of said motor the tension spring returns the channel to the original position.

8. A solar collector-skylight assembly according to claim 6, wherein an electrical circuit means is operatively connected to said motor, said circuit including a control mechanism, temperature and light intensity sensors connected to said control mechanism, switch means, relay means, and pump means for circulating fluid to be heated through said pipes, whereby the sensors not only sense the temperatures of the fluid flowing through the collector and in the interior of the building upon which the solar-collector - skylight assembly is mounted, but also the light intensity within the building, the sensed information being transmitted to said control mechanism for controlling the pump and motor to thereby move the parabolic reflectors to full heat absorption position, to full light transmission position, or to a desired intermediate position.

* * * * *